SERIAL MULTIBIT MAGNETIC RECORDING HEAD STRUCTURE

Filed May 10, 1965 5 Sheets-Sheet 1

INVENTORS
Edgar Wolf
Francis C. Marino
BY
Yuter & Spiecens
ATTORNEYS

SERIAL MULTIBIT MAGNETIC RECORDING HEAD STRUCTURE

Filed May 10, 1965 5 Sheets-Sheet 2

Sept. 10, 1968 E. WOLF ETAL 3,401,396

SERIAL MULTIBIT MAGNETIC RECORDING HEAD STRUCTURE

Filed May 10, 1965 5 Sheets-Sheet 3

SERIAL MULTIBIT MAGNETIC RECORDING HEAD STRUCTURE

Filed May 10, 1965 5 Sheets-Sheet 4

Sept. 10, 1968 E. WOLF ET AL 3,401,396

SERIAL MULTIBIT MAGNETIC RECORDING HEAD STRUCTURE

Filed May 10, 1965 5 Sheets-Sheet 5

United States Patent Office 3,401,396
Patented Sept. 10, 1968

3,401,396

SERIAL MULTIBIT MAGNETIC RECORDING HEAD STRUCTURE

Edgar Wolf, New Hyde Park, and Francis C. Marino, Huntington, N.Y., assignors to Digitronics Corporation, Albertson, N.Y., a corporation of Delaware Filed May 10, 1965, Ser. No. 454,473
10 Claims. (Cl. 346—74)

ABSTRACT OF THE DISCLOSURE

A data transmission system comprises a magnetic tape recorder, and a signal transmitter connected via a telephone channel and a signal receiver. The magnetic tape recorder includes a magnetic recording transducer which records characters as a combination of bits serially along the magnetic tape. The recorded character bits are interleaved with sprocket bits. The so recorded magnetic tape is then read to cause a signal transmitter to transmit tone signals via a telephone channel to a signal receiver.

This invention pertains to the transmission of data and more particularly source- data collection and transmission to a remote central office.

There are many systems available for the transmission of data between stations, such as, telegraph offices, remote airline reservation offices and central reservation files, radar outposts and central strategy rooms, remotely located computers, etc. These systems, generally, either because of the information being transferred or because of the speed of transmission desired, or because of the limited number of terminals, utilize complex and expensive acquisition and transmission apparatus.

However, there are many systems which can share in the fruits of present-day electronic data processing but are prevented from doing so. These systems generally have very many sources of data wherein the data is relatively infrequently collected by an unskilled operator. Specifically, the credit card field is a prime example. In this field, a merchant collects the data such as the buyer's credit identification and the amount of the charge. The use of credit cards by department stores, gasoline station chains and restaurants, are prime examples. There is also a demand for inexpensive data acquisition by large merchandising chain stores for inventory control. For example, supermarket chains wherein outlying stores are supplied by a central warehouse require almost daily ordering by the stores from the warehouse. In addition, other applications such as order entry, sales reporting and transaction recording, all of which have many data collecting points and a central office, can also profitably utilize data processing techniques. All of these systems require inexpensive data collecting and transmitting apparatus. If such apparatus were available then central data processing for such systems becomes economically feasible.

In many data transmission systems, a major expense arises from the data transmission links. Most of the presently available systems employ private telephone or telegraph lines, and radio or microwave links. It is apparent that if the transmission link were a public telephone line between subscriber handsets or the like, the transmission link cost would be greatly reduced. In fact, the cost of transmission would be reduced to only the toll established by the telephone utility company for station-to-station calls.

It is accordingly, one of the objects of the invention to provide apparatus for collecting and transmitting data which may be transmitted over public telephone lines.

Even if there is a considerable saving by utilizing public communication lines it is necessary that data collection be performed as simply, reliably and economically as possible when there are many collecting points under the control of unskilled operators. With this in mind, it has become apparent that the capture of data at the point of transaction and its recording on a reusable magnetic tape cartridge can provide a desirable step towards solving this problem, provided the recording on and reading from the magnetic tape are simplified. In such a system a mass of data would be intermittently collected on the tape and at a certain time, the end of the day, for example, all the recorded data would be read and transmitted to a central office.

As is well known, most data is in the form of decimal numbers and alphabetic characters. The numbers and characters are encoded into combinations of bits. For example, each decimal digit can be represented by a coded combination of four binary digits (bits). Most present day recording schemes contemplate that the four bits representing a decimal digit be recorded simultaneously in four parallel channels of a magnetic tape. The parallel recording requires four separate recording head elements disposed transversely of tape movement. To transmit the data after reading it would be necessary either to provide four transmission channels or to serialize the parallel bits and transmit them over a single transmission channel. Obviously, the use of four transmission channels in the form of four lines for parallel transmission of the bits representing a decimal digit precludes the use of public telephone lines. However, it may be possible, by serializing the bits by the use of modulated carrier techniques and the assigning of sub-carrier bands to each bit position of the binary representation, to employ a single telephone line. If such a scheme were carried out, the complexity and cost of the equipment for converting from parallel to serial representation would prohibit its use in small scale data collecting units. Therefore, it becomes apparent that the bits representing the decimal number be serially recorded along a single channel or track of the tape. A serial bit recording solves the problem at the transmission end. However, there is the problem of initially serializing the bits representing the decimal digit. Generally, the input device comprises a plurality of subject operable switches, each associated with one of the decimal digits. The outputs of the switches, per se, generate the binary representation, or they are fed to an encoder which generates the binary coded combination of signals which represent the decimal digit. In either case, voltages on four parallel lines provide the binary representation. In order to serially record the bits it is now necessary to convert the parallel representation to a serial representation. Heretofore, a scanning means whose output was coupled to a single channel recording head sequentially sampled the four voltage carrying lines as the tape moved past the head. While such a scheme is feasible, the equipment associated with the scanner added to the complexity and expense of the data collector.

It is accordingly an object of one aspect of the invention to provide improved means for serially recording the bits representing a character on a single channel of magnetic tape.

It is another object of this aspect of the invention to provide a magnetic recording head which performs, per se, a parallel-to-serial conversion of the bits representing a character.

It is a further object of this aspect of the invention to provide a magnetic recording head which receives in parallel the bits representing a character and efficiently and economically produces a high level serial recording of the bits on a magnetic tape.

Briefly, this aspect of the invention contemplates a magnetic transducer which is positionable against a record medium that is movable along its longitudinal axis. The magnetic transducer in response to signals induces in the record medium lonitudinally spaced regions of magnetization. The transducer comprises a core of ferromagnetic material having a longitudinal axis which is aligned parallel to the longitudinal axis of the record medium and a bottom face portion that is positioned against the record medium. The bottom face portion is provided with a plurality of grooves aligned substantially transverse to the longitudinal axis of the core. There are a plurality of multiturn windings, each of which is wound around the core and associated with one of the grooves. The multiturn windings are selectively connectable to sources of electrical energy so that coded combinations of regions disposed longitudinally along the record medium are magnetized.

In order to fix the bit times with respect to a bench mark for insuring the reliable interpretation of the bits representing the character or digit, particularly in non-return-to-zero signal representations of data, it is necessary to provide what has become known as sprocket signals.

According to a further feature of this aspect of the invention, the core of the magnetic transducer is provided with a second plurality of grooves and there is a second plurality of windings developed about the core. When the first plurality of windings is selectively energized, all of the windings of the second plurality are energized so that for each character there is recorded a coded combination of longitudinally spaced regions of magnetization representing a character and a plurality of longitudinally spaced regions of magnetization representing sprocket bits.

Further features of this aspect of the invention are directed to the sources of the electrical energy which feed the windings and to the means for incrementally stepping the record medium between the recording of the serial bit representation of each character or number.

In the transmission of data between two very remote points wherein the data is represented by sequentially occurring combinations of mark and space signals, there must be some time base or synchronization to serve as a reference upon which the sampling means, at the receiver, can rely in determining the times to sample the incoming signals to correctly extract the information. Heretofore, it has been common in some systems to precede each group of signals representing a number, a character or groups thereof, by a start mark and terminate the group of signals by a stop space. In other systems, each group was either preceded or followed by a single signal which provided the synchronization. However, in order to maintain the synchronization over the group of sigals, it was necessary to include added equipment at the receiver. Even with this added equipment, there was still the possibility of losing the synchronization because of moderate changes in the transmission rate. For example, a ten percent change in transmission rate could cause ambiguity in the sensing of the latter occurring signals in the group.

It is therefore, an object of another aspect of the invention to simplify and make more reliable the sensing of characters represented by coded combinations of serially occurring signals.

It is another object of the invention to minimize the possibility of the ambiguous sensing of coded combinations of signals representing data when the transmission rate fluctuates over a wide range.

It is a further object of the invention to provide an improved method of transmitting characters of information represented by binary coded signals wherein the significance of the signals is more reliably determined through the agency of sprocket signals.

Briefly, this aspect of the invention contemplates transmitting characters of information wherein each character is represented in binary form. The transmission time is divided into a plurality of time slots. The information is represented by a coded combination of sequential time slot data signals. The data signals have first and second unique states in accordance with the binary representation of the character. There is also transmitted in each time slot a sprocket signal for indicating the start of a time slot.

According to a feature of this aspect of the invention there is provided apparatus for receiving information bits from one source and sprocket bits from another source and for transmitting interleaved sprocket and data signals over a single output channel.

In a system having a plurality of very remote inputs and a central processor, it is necessary to transmit the information of the remote inputs to the processor over some sort of communication link. As has been previously stated, standard public telephone lines offer an inexpensive link. When the distance between the central and the remote inputs involves long distance calling, the toll charges are considerably lower during the night time hours. This economy would be defeated if it were necessary to employ an operator at each remote input to initiate transmission during off-duty hours. Therefore, it is desirable to provide for unattended input transmitters which are activated by the central. However, if the communications link is a public telephone system there is the danger that an ordinary telephone user while calling a wrong number would activate the transmitter. Where the transmitter includes a magnetic tape which causes the information to be transmitted, a single transmission would make the information unavailable for further transmission. Although it is possible to include rewind facilities for the tape, the tape transport becomes complex and expensive. The economy goal would again be defeated. Even if economy were not a goal, there is also the consideration of maintaining privacy.

It is accordingly a general object of another aspect of the invention to cause a remote unattended transmitter connected to a public telephone system to transmit information only when called by a specific calling telephone.

It is another object of this aspect of the invention to insure that an information transmitter connected to a public telephone system is not triggered into operation as a result of a wrong number call by an outside caller.

Briefly, this aspect of the invention contemplates a telephone system which includes: a first telephone adapted to receive a calling signal and a characteristic tone and to transmit information signals; and a second telephone adapted to transmit a calling signal and a characteristic tone and to receive information signals. Information signal generating apparatus is coupled to the first telephone. The apparatus includes first means for sensing for a calling signal received by the first telephone. The first means energizes second means to establish a connection between the telephones when the calling signal is sensed. Third means sense for the characteristic tone when received by the first telephone. The third means cooperate with the first means to deenergize the second means for interrupting the connection between the telephones, if the characteristic tone is not sensed within a given period of time. The third means further activate fourth means to transmit information signals to the first telephone for transmission to the second telephone only after the characteristic tone is sensed.

Other objects, features and advantages of the various aspects of the invention will be apparent from the following detailed description when read with the accompanying drawing which shows, by way of example and not limitation, apparatus for practicing the invention.

Generally, the system comprises two units: the information recorder wherein an operator enters information, via a keyboard, for recording on a magnetic tape supported in a cartridge; and an unattended information transmitting apparatus wherein the information on the magnetic tape is transmitted via telephone system to a remote receiver under the command of the remote receiver. The recorder and the transmitter are separate units. After the operator has recorded the information on magnetic tape, he rewinds the magnetic tape and then removes the cartridge from the recording unit and places it in the transmitting unit. At a subsequent time, the remote receiver activates the transmitter. For example, a recorder and a transmitter set may be located in each of a plurality of "mail order" outlets throughout a multistate region and the receiver may be a data processing system located in a central warehouse. During the day, as a mail order clerk accepts orders from customers, he enters information related to the orders on the magnetic tape in the recorder. The orders are intermittently accumulated on the magnetic tape. At the end of the day, the clerk removes the information-loaded magnetic tape cartridge from the recorder and loads it into the transmitting apparatus and depresses a spring return switch therein. He then closes the store and leaves for the night. The transmitter of the transmitting apparatus is acoustically coupled to a conventional subscriber telephone. Sometime during the night, the central warehouse calls the subcriber telephone in the usual manner, i.e., by merely dialing the number of the subscriber telephone. The transmitter is interrogated by a signal and starts transmitting the information recorded on the magnetic tape. The next morning the clerk need only remove the cartridge from the transmitter, insert it in the recorder, rewinds the tape and start entering new transactions.

Figure 1:
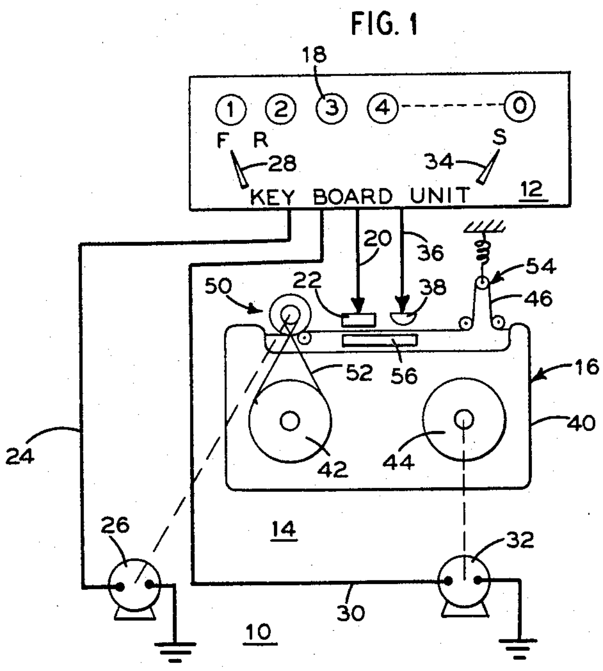
FIG. 1 is a schematic diagram of apparatus for recording information on a magnetic tape, in a cartridge, in accordance with one aspect of the invention.

The recorder will first be generally described with reference to FIG. 1. The recorder 10 includes a keyboard unit 12 and a tape transport 14 in which is positioned a magnetic tape cartridge 16. The keyboard unit 12 includes a plurality of entry keys 18 which when activated result in the transmission of information signals via the cable 20 to the recording head 22, and stepping pulses via line 24 to takeup stepping motor 26 of the transport 14. There is also provided a switch 28 to control the transport 14 to takeup tape or to rewind the tape. During tape rewind the switch 28 is in the R position and a signal is fed via line 30 to continuous drive rewind motor 32 of transport 14. In addition, keyboard unit 12 includes a spring-return switch 34 which when in the start (depressed) position S causes stepping motor 26 to operate for a period of time to provide an information-free leader of magnetic tape. Also, keyboard unit 12 includes circuitry for transmitting a signal via cable 36 to erase head 38 only during the recording of information.

The cartridge 16 may be a conventional cartridge of the type commercially available for home type magnetic recording systems and manufactured by the Radio Corporation of America under the designation Snap-Load Cartridge, type 10M–5.6C. The cartridge 16 includes a housing 40 for a takeup reel which has a drivable portion 42 extending through the housing 40, and a rewind reel which has a drivable portion 44 which also extends through the housing. Magnetic tape 46 moves between the reels. The cartridge 16 also includes pulley and tape guiding components which are not shown since they form no part of the invention.

The tape transport 14 includes a pinch roller-capstan assembly 50 mechanically connected to the output shaft of stepping motor 26 for moving tape 46 during recording. A belt drive 52 connects assembly 50 to the portion 42 of the takeup reel. The shaft of rewind motor 32 is connected to the portion 44 of the rewind reel. A tape tensioning assembly 54 including pulleys and a spring controls the tension of the tape 46 during the recording operation. There is also provided a recording head 22 and an erase head 38 longitudinally displaced from each other. During recording, the tape 46 first moves past head 38 and is erased, and then moves past the recording head 22. A pressure pad 56 urges tape 46 against heads 22 and 38. Of course, transport 14 includes the usual mechanical structure for supporting the cartridge 16 and the various cited elements. Since this structure is obvious to those skilled in the art and forms no part of the invention it has not been shown, nor will it be discussed.

The operation of the recorder 10 will now be discussed in general terms. The detailed description will be made, hereinafter, with respect to FIGURES 3 to 6. With the cartridge 16 mounted in the transport 14 and the tape 46 rewound, the operator moves switch 28 to the F position and momentarily depresses spring-return switch 34 to the S position. Keyboard unit 12 transmits, via cable 36, erase current to erase head 38, and via line 24, a plurality of pulses to stepping motor 26. A leader length of tape 46 is pulled by pinch roller-capstan assembly 50 from the rewind reel through the tape tensioning assembly 54, and past the heads 22 and 38, and wound onto the takeup reel. After the leader length has been moved, the stepping pulses become dependent upon operation of the entry keys 18. However, the erase current continues to be fed to erase head 38.

When an entry key 18 is depressed, signals (current pulses) are fed via cable 20 to recording head 22. A coded combination of longitudinally displaced areas (data bits) of the magnetic tape 46 are magnetized, representing the entered decimal number and associated sprocket bits. A pulse is also fed via line 24 to stepping motor 26 which then moves the magnetic tape 46 a distance somewhat greater than the longitudinal length of the recording head 22 so that a new length of tape is available for recording. Subsequent numbers are recorded in a similar manner.

Figure 2:
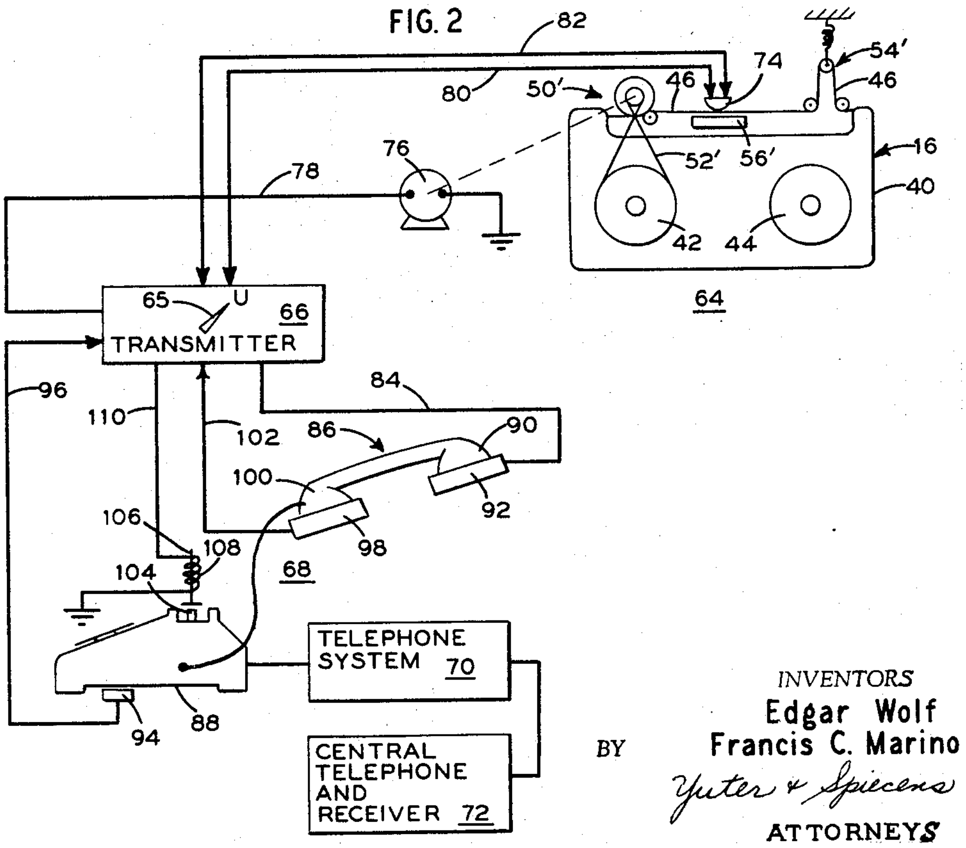
FIG. 2 is a schematic representation for transmitting the information recorded on the magnetic tape cartridge via a telephone system to a remote receiver, in accordance with another aspect of the invention.

When all recording is finished for the day, the operator moves the switch 28 to position R. Erase current stops flowing to erase head 38, but a signal is fed to rewind motor 32 via line 30. The tape 46 is drawn onto the rewind reel. When the tape is completely on the rewind reel, cartridge 16 is removed from tape transport 14 and put on the transport of the transmitting apparatus of FIG. 2.

The transmitting apparatus (FIG. 2) includes a tape transport 64, a transmitter 66, and a conventional telephone handset 68 connected via a public telephone system 70 to a central telephone and receiver 72.

The tape transport 64 is similar to tape transport 14. Therefore, primed reference characters will be used for like elements and only the differences will be discussed. In particular, there is only provided drive means for moving tape 46 from the rewind reel to the takeup reel of cartridge 16, and there is only a reproducing head 74 instead of recording head 22 and erase head 38. The drive means is a continuous operating motor 76 whose shaft is coupled to the pinch roller-capstan assembly 50'. Motor 76 operates continuously as long as a signal is present on line 78 from transmitter 66. While tape 46 is moving, data signals and sprocket signals generated by reproducing head 74 in response to regions of magnetization on tape 46 are fed via lines 80 and 82 respectively to transmitter 66.

Transmitter 66 includes circuitry for responding to interrogations received by telephone 68 from the central telephone and receiver 72 via telephone system 70. The circuitry includes means which, when properly interrogated, energizes drive motor 76 and transmits frequency modulated tones via line 84 to telephone 68 in response to the signals received from the lines 80 and 82.

Telephone 68 is a conventional public subscriber telephone whose handset 86 is removed from the cradle of the base 88. The microphone input 90 is placed against a speaker 92 connected via line 84 to transmitter 66. Therefore, the frequency modulated signals on line 84 are transduced to frequency modulated tones by speaker 92. These tones are transmitted by telephone 68 in the usual manner as for voice tones. A microphone 94 is placed close to the call bell in the base 88 of the telephone 68. Microphone 94 is connected via lead 96 to transmitter 66. Another microphone 98 is fitted over the speaker portion 100 of handset 86 and is connected via lead 102 to transmitter 66. Finally, cradle switch 104 is held down by plunger 106 until solenoid 108 raises the plunger in response to a signal on line 110 from transmitter 66.

The overall operation of the transmitting apparatus will now be described; the detailed description will be reserved for the discussion of FIG. 7.

Initially, tape 46 is on the rewind reel of cartridge 16, tape transport 64 is not moving, and plunger 106 is pressing down on cradle switch 104. When telephone 68 is called, either from the central 72 or any wrong number caller, the bell in the base 88 rings. Microphone 94 picks up the ring and transmits a signal via line 96 to transmitter 66. Transmitter 66 transmits a signal, via line 110, energizing solenoid 108 which raises plunger 106. Cradle switch 104 closes and connection is, accordingly, made between telephone 68 and the calling telephone. Transmitter 66 also activates a timing circuit which will remove the signal from line 110, opening the connection between the telephones if transmitter 66 does not transmit the frequency modulated signals to speaker 92 for a given time interval.

If the central telephone and receiver 72 is actually making the call, it will then transmit a characteristic tone. The tone is picked up by microphone 98 and fed via line 102 to transmitter 66. Transmitter 66 in response to the sequential occurrence of the calling ring and the characteristic tone will feed a signal via line 78 to drive motor 76. Transport 64 starts moving and the data and sprocket signals generated by tape 46 moving past reproducing head 74 are fed via lines 80 and 82 to transmitter 66. Transmitter 66 in response to these signals feeds the frequency modulated signals representing the data and sprocket bits to speaker 92. The frequency modulated tones generated by speaker 92 are fed via telephone 68 and telephone system 70 to central telephone and receiver 72. When there is no longer any data or sprocket signals received from reproducing head 74 for a given period of time indicating no more information is to be transmitted, the time circuit operates. Solenoid 108 is deenergized, plunger 106 pushes down cradle switch 104, opening the connection between the telephones.

It should be noted that the disconnection of the two telephones occurs if the transmitter does not transmit signals to speaker 92 for a given period of time. This can occur on two occasions. The first is at the end of information transfer as just described. The second is when information transfer never started. It will be recalled that the transfer of information from tape 46 to transmitter 66 can only start if the characteristic tone was picked up by microphone 98. Therefore, if a wrong number caller were connected to telephone 68, there would not be generated the characteristic tone. Accordingly, a short time after the connection between the telephone of the wrong number caller and telephone 68 were made, it would be opened.

The electronic details of the recorder 10 will now be described with reference to FIG. 3. This keyboard unit 12 includes the key-operated switches 18–1 to 18–0 which represent the decimal digits 1, 2, . . ., 9, 0. Although, the unit 12 is shown as accepting decimal number entries, it should be apparent that it could also be expanded to handle alphabetic characters and other symbols. In any event, each switch 18 has a moving contact connected to the negative output terminal 120 of voltage source 122, and a fixed contact connected to an input terminal of the decimal-to-binary encoder 124. For example moving contact 18–3M of switch 18–3, associated with the decimal number 3, is connected to terminal 120 and its fixed contact 18–3F is connected to input terminal 3I of encoder 124.

Encoder 124 is a conventional encoding matrix which converts the signal representation of a decimal number represented at inputs 1I to 0I to a coded combination of signals which are the binary representation of the decimal numbers and are transmitted from output terminals O1, O2, O4 and O8. It, preferably, further includes a parity bit generator which generates odd parity bits for the binary representations which are transmitted from output terminal OP. Since such devices are well known, the following table summarizes the results of the encoding.

TABLE I

| Decimal Number | Input Terminals | | | | | | | | | | Output Terminals | | | | |
|---|---|---|---|---|---|---|---|---|---|---|---|---|---|---|---|
| | 1I | 2I | 3I | 4I | 5I | 6I | 7I | 8I | 9I | 0I | O1 | O2 | O4 | O8 | OP |
| 1 | 1 | 0 | 0 | 0 | 0 | 0 | 0 | 0 | 0 | 0 | 1 | 0 | 0 | 0 | 0 |
| 2 | 0 | 1 | 0 | 0 | 0 | 0 | 0 | 0 | 0 | 0 | 0 | 1 | 0 | 0 | 0 |
| 3 | 0 | 0 | 1 | 0 | 0 | 0 | 0 | 0 | 0 | 0 | 1 | 1 | 0 | 0 | 1 |
| 4 | 0 | 0 | 0 | 1 | 0 | 0 | 0 | 0 | 0 | 0 | 0 | 0 | 1 | 0 | 0 |
| 5 | 0 | 0 | 0 | 0 | 1 | 0 | 0 | 0 | 0 | 0 | 1 | 0 | 1 | 0 | 1 |
| 6 | 0 | 0 | 0 | 0 | 0 | 1 | 0 | 0 | 0 | 0 | 0 | 1 | 1 | 0 | 1 |
| 7 | 0 | 0 | 0 | 0 | 0 | 0 | 1 | 0 | 0 | 0 | 1 | 1 | 1 | 0 | 0 |
| 8 | 0 | 0 | 0 | 0 | 0 | 0 | 0 | 1 | 0 | 0 | 0 | 0 | 0 | 1 | 0 |
| 9 | 0 | 0 | 0 | 0 | 0 | 0 | 0 | 0 | 1 | 0 | 1 | 0 | 0 | 1 | 1 |
| 0 | 0 | 0 | 0 | 0 | 0 | 0 | 0 | 0 | 0 | 1 | 0 | 1 | 0 | 1 | 1 |

In Table I, a "0" represents the presence of a high voltage or no signal and "1" represents the presence of a low voltage or a signal.

Each of the outputs of the encoder 124 is connected to a current source 126. The function of each current source is to deliver a pulse of current. In order to minimize the surge current, a particular circuit is utilized. Since each of the current sources is identical, only source 126–1 is shown in detail. Current source 126–1 includes, preferably, a junction transistor 128 having a base electrode connected to output terminal O1 of encoder 124, a collector connected via a resistor 130 to lead 20–1, and an emitter connected via capacitor 132 to lead 20–1R and to one terminal of resistor 134. The other terminal of resistor 134 and similar resistors in the other current sources 126 are connected to the negative terminal of voltage source 136 whose positive terminal is grounded. The leads 20–1 and 20–1R are connected to winding 22–1 of recording head 22.

When a signal is not present at output terminal O1 of the encoder 124, transistor 128 is cut-off. Charge from voltage source 136 trickles via resistor 134 onto capacitor 132. When capacitor 132 is charged and a signal is present at output terminal O1, transistor 128 switches on (conducts). Capacitor 132 discharges via lead 20–1R, winding 22–1, lead 20–1, resistor 130 and the collector-emitter circuit of transistor 128. Therefore, a pulse of recording current passes through head winding 22–1. Current sources 126–2, 126–4, 126–8 and 126–P operate similarly in response to signals on their associated outputs of encoder 124. In this manner, the data bits representing a character are converted to current pulses fed to their associated windings for recording.

At the same time, a plurality of sprocket bits which interleave the data bits when recorded, as will hereinafter become apparent, are generated.

In particular, each of the output terminals of encoder 124 are fed to a conventional OR circuit 140 which transmits a signal from its output if a signal is present on any one of its inputs. The output or OR circuit 140 is connected via amplifier 142 to current source 126–S. Current source 126–S which is similar to the previously described current sources is connected to the serially connected sprocket windings 22S by leads 20S and 20SR. Therefore, whenever there is an output signal from encoder 124 a current pulse passes through the six sprocket windings 22S.

In addition, the output of OR circuit 140 is connected to an input of pulse generator 144 which may be a blocking oscillator or any similar monostable device which emits a high energy pulse each time it is triggered. The pulse from pulse generator 144 passes through the first bank 28–1 of switch 28 which is closed when the switch 28 is in the F position (FIG. 1), i.e., when recording is to take place. From the fixed contact of bank 28–1, the pulse passes via lead 24 to stepping motor 26. Because of the inertia in the transport 14 (FIG. 1) tape 46 moves after the current pulses have passed through the windings of the recording head. Tape 46 moves to a new position so that the representation of another number can be recorded.

In order to provide the initial leader for the tape 46, a second input of pulse generator 144 receives pulses from gated astable multivibrator 146, of convention design. The gating input is connected via spring-return switch 34 to source 148 of gating voltage. Therefore, when switch 34 is depressed, astable multivibrator 146 generates a train of pulses of suitable repetition rate. The pulses are fed as triggers to pulse generator 144 which generates pulses that are fed to stepping motor 26. Hence, in order to create a leader on the tape, the operator first depresses switch 34 and then releases it after a given period of time.

Figure 3:
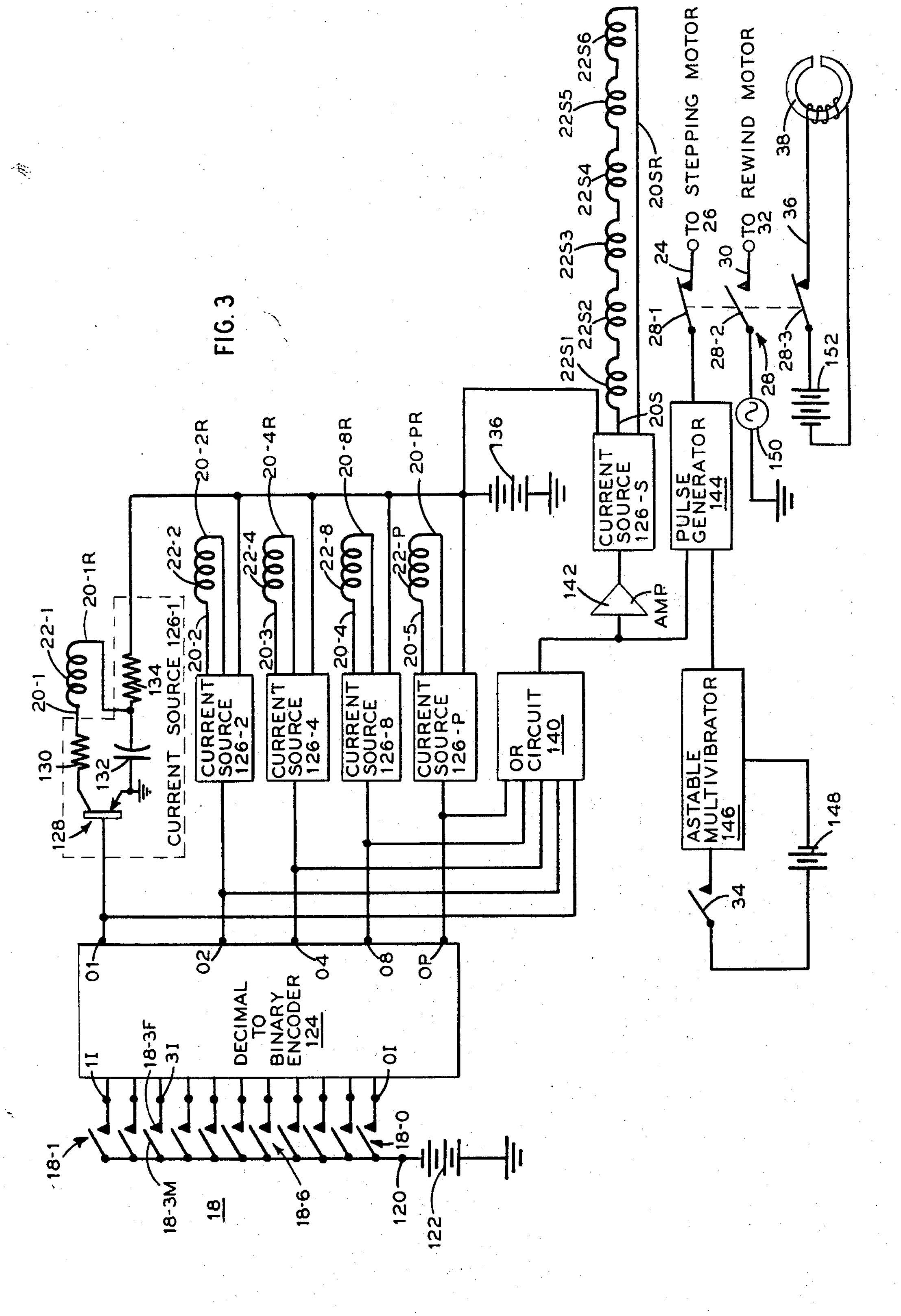
FIG. 3 is a schematic diagram of the recording circuitry of the recording apparatus of FIG. 1.

The remainder of FIG. 3 concerns the second and third banks of forward-rewound switch 28. Bank 28–2 connects the source of voltage 150 to rewind motor 32 when switch 28 is in the rewind R position. Bank 28–3 connects the source of erase current 152 via lead 36 to erase head 38 when switch 28 is in the forward F position.

In accordance with one aspect of the invention, the data bits representing a decimal number are recorded simultaneously, longitudinally, along the tape 46. Furthermore, the data bits are interleaved with sprocket bits. There has been described above the simultaneous generation of the current pulses fed to the windings of the recording head 22. However, the geometry of the recording head 22 determines the relative positioning of the bits on the magnetic tape 46.

Figure 4:
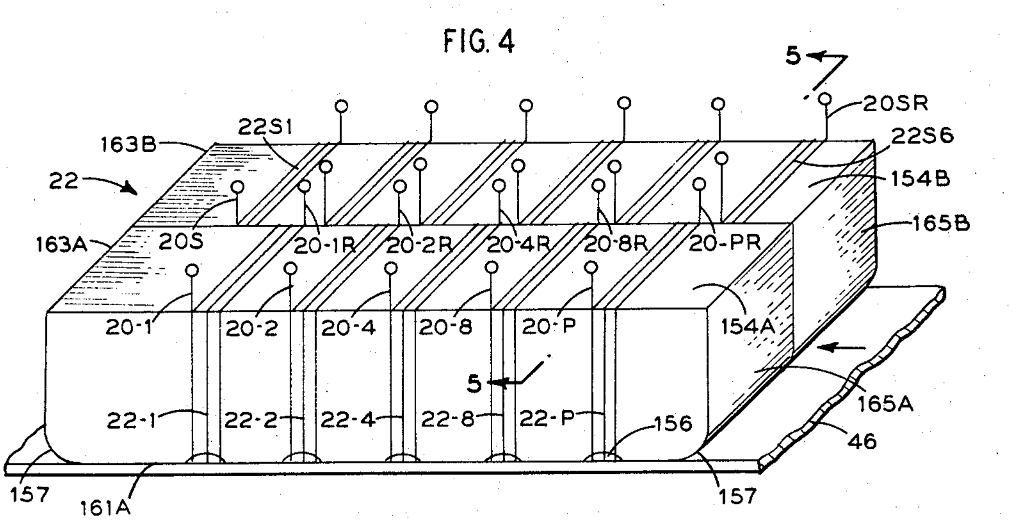
FIG. 4 is a perspective view of the magnetic recording head employed by the apparatus of FIG. 1.
Figure 5:
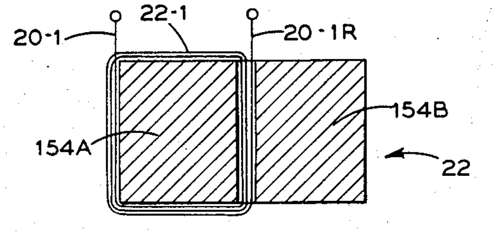
FIG. 5 is a sectional view of the magnetic recording head taken along the line 5—5 of FIG. 4.
Figure 6:
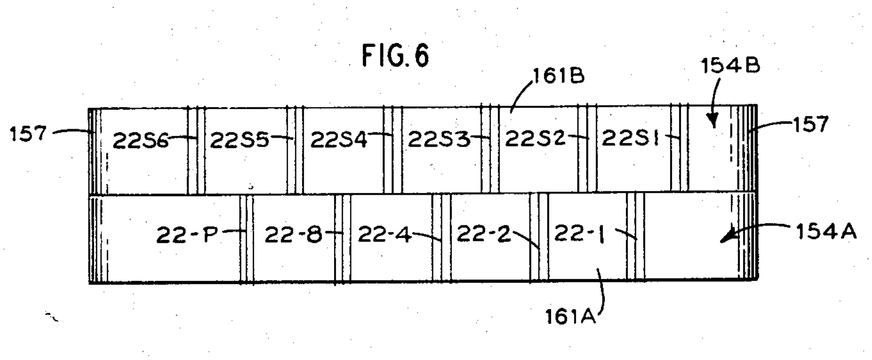
FIG. 6 is a view of the face of the magnetic recording head which is positioned opposite the magnetic tape.

More particularly, FIGS. 4, 5 and 6 show the recording head 22 for practicing this aspect of the invention. Recording head 22 includes a core of ferrite comprising two portions 154A and 154B. The cores 154A and 154B are in the form of parallelepipeds with their longitudinal axes parallel to the longitudinal axis of magnetic tape 46. The bottom faces, i.e., the faces positioned against tape 46, are provided with grooves, such as groove 156, which extend transverse to the longitudinal axis of tape 46. Core 154B is provided with six such grooves which are longitudinally spaced from each other by equal distances. Core 154A is provided with five such grooves which are positioned longitudinally at equidistances from pairs of the grooves of core 154B. Each of the grooves accommodates a multiturn winding. In particular, the five grooves of core 154A accommodate the windings 22–1, 22–2, 22–4, 22–8 and 22–P. Each of these windings is separately wound core 154A. Similarly, the six grooves of core 154B accommodate the windings 22S1 to 22S6 which are wound around core 154B serially. With the windings in place, the cores 154A and 154B are joined to provide a unitary structure. Although FIG. 6 shows a bottom view of the recording head 22, it can be visualized as representing the recording pattern on the tape 46 if all windings are simultaneously energized. In such a case, it is seen that current in windings 22S1 to 22S6 produces six equispaced sprocket bits in a data track of the tape 46, and current in windings 22–1, 22–2, 22–4, 22–8, and 22–P produces five equispaced data bits in a data track laterally displaced from the sprocket track. The data bits are, longitudinally, interleaved with the sprocket bits. Although it is theoretically possible to have a recording head with a single core having eleven windings alternately assigned to data bits and sprocket bits, in order to obtain a high linear packing density on the tape, it has been found that the above described two section core configuration economically and admirably satisfies the desired result.

Since the cores 154A and 154B, when the windings are receiving current, can act like bar magnets it is necessary to smoothly round the corners 157 when the bottom faces 161 meet the end faces 163 and 165. Therefore the possibility of fringing flux affecting the recording is minimized.

Figure 7:
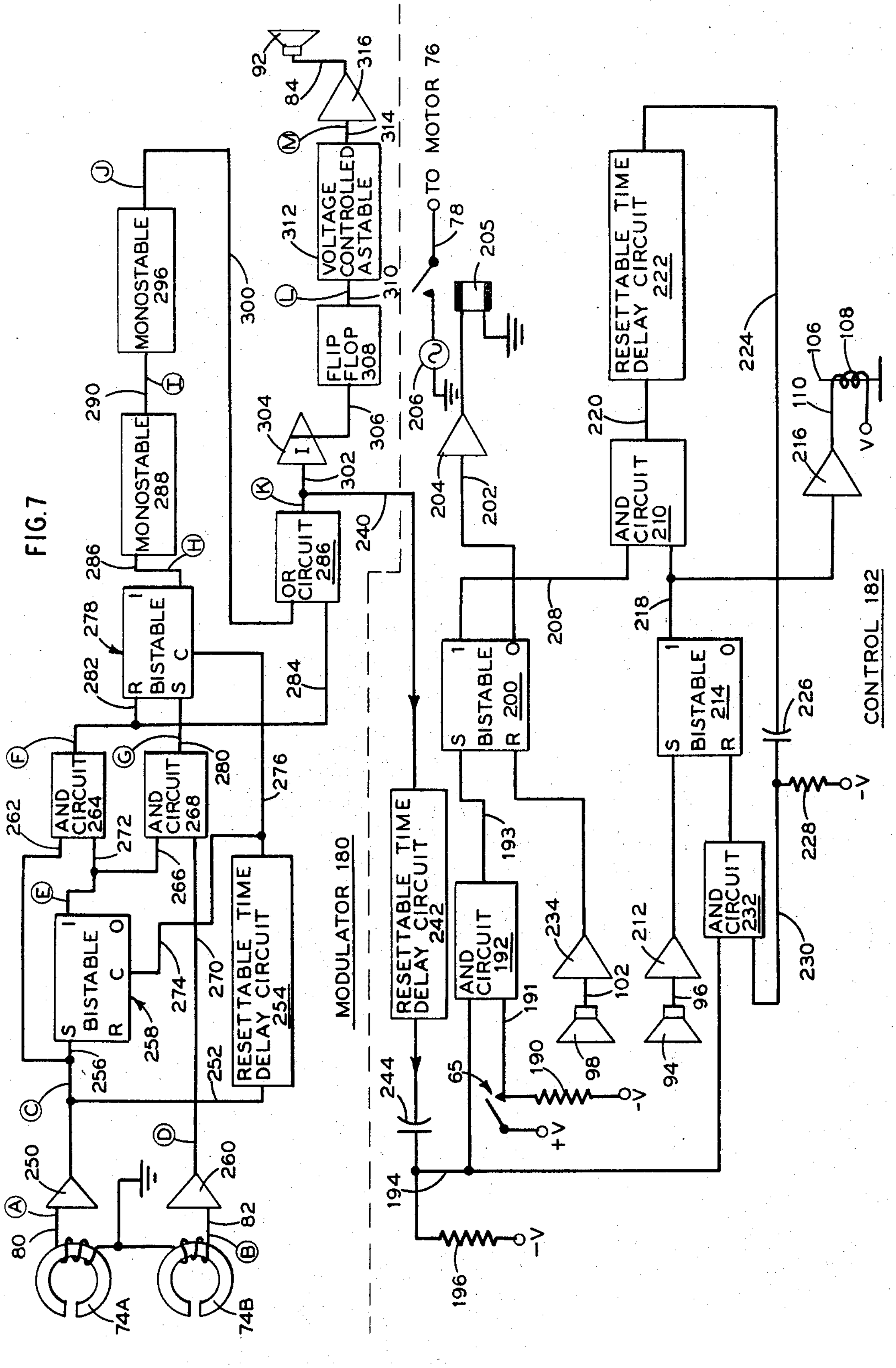
FIG. 7 is a block diagram of the electrical circuitry of the transmitter of FIG. 2.

The transmitter 66 and its related circuitry is shown in FIG. 7 comprising a modulator 180 and a control, 182. The modulator 180 receives signals representing the bits recorded on the magnetic tape 46 as pulses in two tracks and converts the signals to a continuous waveform shifting between two frequencies in a single channel.

The control 182 controls the starting and stopping of the transport 64 (FIG. 2) of the transmitting apparatus and will be described first.

It will be recalled that to sensitize the transmitter 66 to respond to interrogations, switch 65, a spring return type, was momentarily closed. Switch 65 has a moving contact connected to a source of positive potential V and a fixed contact connected via a resistor 190 to a source of negative potential —V. The fixed contact is also connected to one input of AND circuit 192 whose other input is connected to line 194. AND circuit 192 is a logic circuit which passes from its output terminal the most positive voltage present at any one of its input terminal, i.e. it will pass a negative voltage only if both of its inputs are negative. At the time switch 65 is closed, line 194 will be at a negative potential by virtue of resistor 196 connected to source of negative potential —V. Therefore, when the switch 65 is closed, a positive going potential is transmitted on line 191 to an input of AND circuit 192 which accordingly transmits this positive going voltage via line 193 to the set-to-one input S of bistable 200. Bistable 200 is a conventional Eccles-Jordan flip-flop which also includes a set-to-zero input R, a "1" output and a "0" output. The bistable 200 is set to the "1" state when it receives a positive going signal at the input S, and is set to the "0" state when it receives a positive going signal at the R input. When bistable 200 is set to the "1" state, the signal at the "1" output switches negatively and the signal at "0" output switches positively. When bistable 200 is set to the "0" state, the signal at the "1" output switches positively and the signal at the "0" output switches negatively. The "0" output of bistable 200 is connected via lead 202 to an input of amplifier 204. The output of amplifier 204 is connected to the coil of relay 205 whose normally open contacts control the flow of electric current from source 206 via line 78 to motor 76. The "1" output of bistable 200 is connected to one input of AND circuit 210.

The positive going signal on lead 193 sets bistable 200 to the "1" state. The "0" output goes positive, and, since amplifier 204 will only energize relay 205 when it receives a negative signal the relay is unenergized. The signal at the "1" output goes negative placing a negative voltage on line 208.

Microphone 94, positioned near the bell of the telephone 68 (FIG. 1) is connected via lead 96 to the input of amplifier 212.

Amplifier 212 of conventional design includes a band pass filter and a rectifier. The band pass is chosen so that the amplifier only responds to the frequency of the alternations of the ring. The rectifier converts the alternating signal to a direct-current signal. Therefore, for each ring of the bell, amplifier 212 will transmit a pulse having a duration equal to the time of the ring. The rectifier is polarized to transmit a negative going pulse. The output of amplifier 212 is connected to the set-to-one input S of bistable 214.

Since bistable 214 is similar to bistable 200, it will not be described. The "1" output of bistable 214 is connected to the input of amplifier 216 which drives solenoid 108. Therefore, at the end of the first ring the positive going trailing edge of the pulse from amplifier 212 triggers bistable 206 to the "1" state and amplifier 216 energizes solenoid 108. Plunger 106 is withdrawn from cradle switch 104 (FIG. 2) and telephone 68 is connected to the calling telephone. The "1" output of bistable 214 is also connected via the line 218 to the other input of AND circuit 210. AND circuit 210, which is similar to AND circuit 192, is a logical circuit which will transmit a negative signal from its output if, and only if, both of its inputs receive negative signals. If either of its inputs is at a positive voltage, it transmits a positive voltage. Therefore, since at this time both inputs are at negative voltages, it transmits a negative voltage via lead 220 to resettable time delay circuit 222. Circuit 222 is a resettable delay-flop which when triggered by a received pulse delivers from its output a negative going signal which remains negative for a given time interval and then goes positive. However, while the output is still negative, and it is triggered again, it will remain negative again for the given period of time. The output of circuit 222 is connected via lead 224 to one end of differentiating capacitor 226 whose other end is connected via resistor 228 to a source of negative potential −V. The other end of capacitor 226 is also connected via lead 230 to one input of AND circuit 232 whose output is connected to the set-to-zero input R of bistable 214. Since AND circuit 232 is similar to AND circuit 192, it will not be further described.

Hence, when bistable 214 is set to the "1" state, timing circuit 222 is energized since the voltages on leads 208 and 218 are both negative, and, if the voltage on line 208 does not shift positive within the timing interval, the output of timing circuit 222 goes positive. The positive wavefront is passed by capacitor 226 and AND circuit 232 as a positive going signal to the set-to-zero input R of bistable 214. Bistable 214 sets to "0," the voltage on lead 218 goes positive and solenoid 108 is deenergized. The cradle switch 104 (FIG. 2) opens and the connection between the calling telephone and telephone 68 is opened. This can occur when there was a wrong number call.

If the central had called then before the end of the time interval, it would transmit a characteristic tone. The tone would be picked up by microphone 98 and fed via lead 102 to amplifier 234. Amplifier 234 is similar to amplifier 212, except that its band pass is for the characteristic tone, say at four hundred cycles. The positive going signal transmitted by amplifier 234 is fed to the set-to-zero input of bistable 200 which accordingly sets to the "0" state. The voltage on lead 208 goes positive, and AND circuit 210 stops transmitting a negative voltage. Circuit 222 becomes deenergized before it can transmit a positive voltage on lead 224. At the same time, the voltage on lead 202 goes negative. Amplifier 204 energizes relay 205, motor 76 starts operating, and tape 46 (FIG. 2) is moved past reproducing head 74. The bits are read from the tape 46 and processed by modulator 180. As long as bits are being processed, pulses are fed from modulator 180 via line 240 to the input of resettable time delay circuit 242. Circuit 242 is similar to circuit 222. Therefore, as long as trigger pulses are fed to the circuit 242, which are time spaced by less than a given period, the circuit will not emit the positive going trailing edge. When all the information has been read from tape 46, no more pulses are transmitted by modulator 180. At that time, circuit 242 "times out." The positive going wavefront is differentiated by capacitor 244 and fed to line 194 which is connected to inputs of AND circuits 192 and 232. Accordingly, bistable 200 is set to the "1" state and bistable 214 is set to the "0" state. The switching of bistable 200 results in the deenergization of relay 205 and the stopping of tape transport 64. The switching of bistable 214 results in the deenergizing of solenoid 108 and the opening of cradle switch 104.

Figure 8:
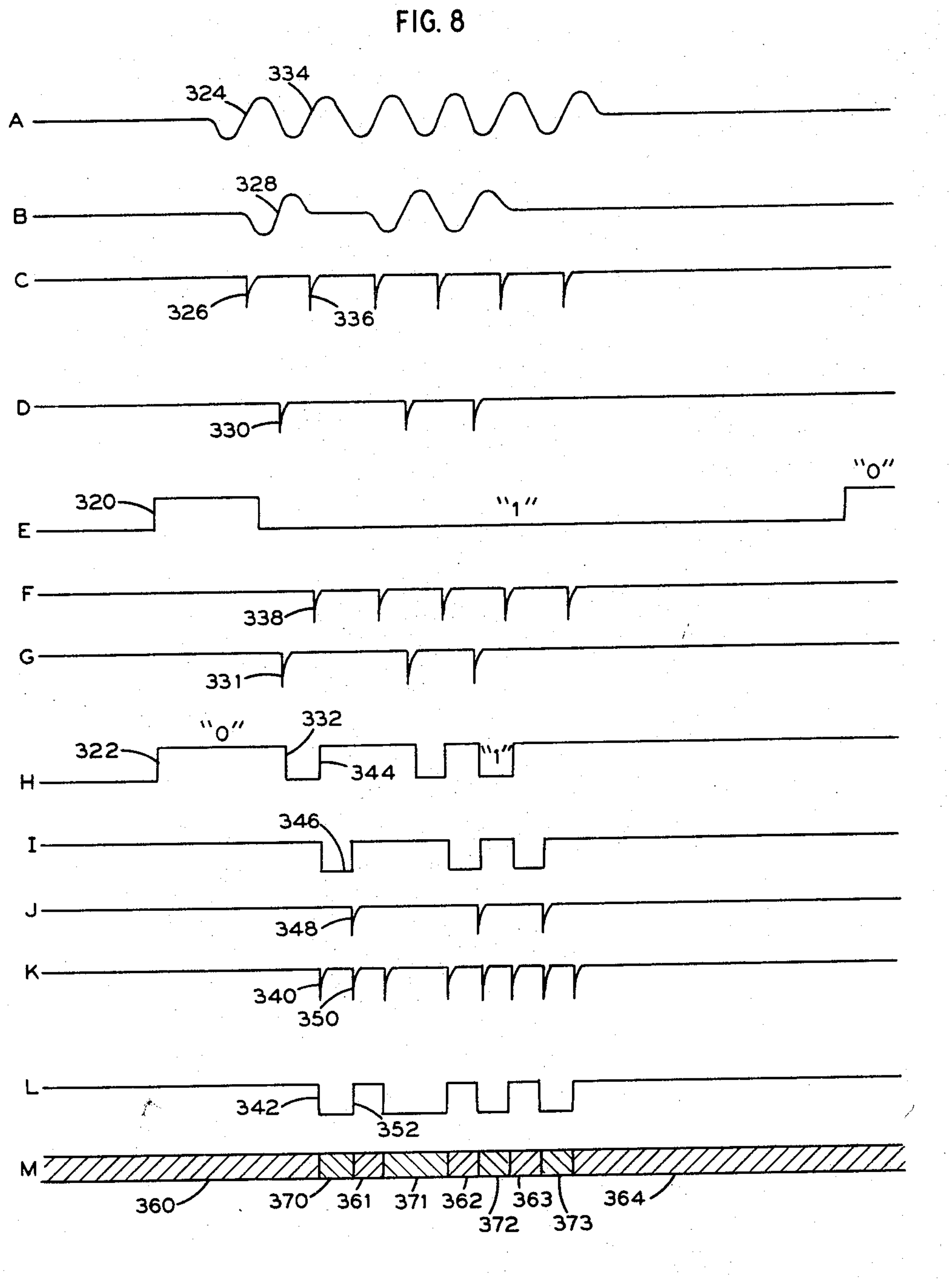
FIG. 8 is a waveform diagram of electrical signals as a function of time at various points throughout the system.

Modulator 180 will be described with the aid of the waveforms of FIG. 8 wherein the data and sprocket bits recorded for the binary number 1011 are shown. Although the binary number represents decimal 11, a number not enterable by the shown keyboard, it is believed that this binary combination best teaches the operation of the modulator. It should be recalled that the numbers are recorded with a gap between each number greater than the distance between two sprocket bits.

Modulator 180 includes tape reading amplifiers 250 and 260 having inputs connected respectively to lines 80 and 82 for receiving the signals from the reproducing heads 74A and 74B opposite the sprocket and data tracks of tape 46. The sprocket waveform on line 80 is indicated by curve A and the data waveform on line 82 is indicated by curve B of FIG. 8. Amplifiers 250 and 260 are of the type which detect positive going zero transitions in the input waveforms and emit pulses for such transitions. The output pulses for amplifiers 250 and 260 are shown respectively by curves C and D of FIG. 8. The output of amplifier 250 is fed via lead 252 to the input of resettable time delay circuit 254, via lead 256 to the set-to-one input S of bistable 258, via lead 262 to one input of AND circuit 264. The output of amplifier 260 is fed via lead 270 to a second input of AND circuit 268. Bistable 258 is similar to the previously described bistables except that it includes a clear input which sets the bistable to the "0" state upon receipt of a signal at that input. The set-to-zero input and the "0" output of bistable 258 are not utilized. The "1" output of bistable 258 is connected via lead 272 to the other input of AND circuit 264 and via lead 266 to the first input of AND circuit 268. The voltage at the "1" output is shown as curve E of FIG. 8. Circuit 254 is similar to resettable time delay circuit 242 except that it has a time constant so that it "times out" if not triggered in a time slightly greater than the time between two sprocket bits in a number. The ouput of circuit 254 is connected via lead 274 to the clear input C of bistable 258, and, via lead 276, to the clear input C of bistable 278. Bistable 278 is similar to bistable 258. Its set-to-one input S is connected via lead 280 to the output of AND circuit 268 and the set-to-zero input R is connected, via lead 282, to the output of AND circuit 264 which is also connected via lead 284 to an input of OR circuit 286. The signal at the output of AND circuit 264 and the signal representing the output of AND circuit 268 are depicted respectively by curves F and G of FIG. 8. The "1" output of bistable 278 is fed via lead 286 to an input of monostable 288. The signal at the output of bistable 288 is shown as curve H of FIG. 8. Monostable 278 is a conventional "one-shot" multivibrator which is triggered by a positive going wavefront to emit a negative going pulse having a duration equal to one half the time between successive sprocket bits.

The output of monostable 288 (curve I of FIG. 8) is fed via lead 290 to the input of monostable 296. Monostable 296 is also a conventional "one-shot" multivibrator which is triggered by a positive going wavefront to emit a very narrow negative going pulse.

The output of monostable 296 (curve J of FIG. 8) is fed via lead 300 to the other input of OR circuit 286. The OR circuit 286 is a logical circuit which transmits a negative voltage whenever either one of its inputs is at a negative voltage. The output (curve K of FIG. 8) is fed, via lead 240, to monostable 242 of control 182, and, via lead 302, to the input of inverting amplifier 304. The output of amplifier 304 is fed via lead 306 to the input of flip-flop 308. Flip-flop 308 is a bistable dveice (a binary counter) having a single input which changes stable states each time a pulse is received at its input. The output of flip-flop 308 (curve L of FIG. 8) is fed via lead 310 to the input of voltage controlled astable 312. Astable 312 is a conventional astable or free-running multivibrator whose frequency of oscillation is controlled by the voltage applied to one of its time constant circuits. The output of astable 312 (curve M of FIG. 8) is fed via lead 314 to low-pass amplifier 316. Amplifier 316 is a conventional amplifier with a low-pass filter to smooth the square waves from astable 312 to a more sinusoidal-like waveform. The output of amplifier 316 is connected via lead 84 to speaker 92.

The operation of modulator 180 will now be described. Sometime during the internumber gap, circuit 254 "times out," and transmits a positive going voltage on lines 274 and 276 to clear (set to the "0" state) the bistables 258 and 278. The outputs of bistables 258 and 278 go positive. See rising waveforms 320 and 322 of FIG. 8. Since the sprocket bits bracket the data bits, the first bit read of any number is a sprocket bit. Such a bit is indicated by reference numeral 324. Amplifier 250 senses the positive going zero-transition and generates pulse 326. The trailing edge of pulse 326 (a positive going transition) triggers bistable 258 to the "1" state. Bistable 258 will remain in the "1" state for the remainder of the number. Its "1" output which is now negative "opens" AND gates 264 and 268.

There next occurs, in time, data bit 328 which is transmitted by amplifier 260 as pulse 330 which passes through AND circuit 268 as pulse 331 to set bistable 278. See wavefront 332. The second sprocket bit 334 is sensed and shaped by amplifier 250 to become pulse 336 which passes through AND circuit 264 as pulse 338. Pulse 338 passes through OR circuit 286 to become the pulse 340. Pulse 340 is fed via line 240 to monostable 242 of control 182 to indicate information is being transmitted. In addition, pulse 340 passes through amplifier 304 to turn over flip-flop 308. See wavefront 342. At the same time, the positive going wavefront 344 resulting from the setting of bistable 278 to the "0" state triggers monostable 288 to emit a pulse 346 of fixed time duration. The trailing edge of pulse 346 triggers monostable 296 which generates a narrow pulse 348 that passes through OR circuit 286 as pulse 350 to turn over flip-flop 308. See wavefront 352.

Now, several facts are worth noting. Bistable 278 is always set to the "1" state by a data bit and always set to the "0" state by the next occurring sprocket bit. The setting to the "0" state of bistable 278 results in the generation of a narrow pulse representing a data bit at a very precise time after the pulse representing the preceding sprocket bit. Therefore, any skew in reproducing head 74 is effectively removed. Furthermore, the sprocket bits and the data bits that were in two separate tracks of the tape are merged into a single pulse train at the output of OR circuit 286. Finally, by the action of flip-flop 308 the "return-to-zero" pulses at the output of OR circuit 286 are converted to a "nonreturn-to-zero" (NRZ) waveform at the output of flip-flop 308. The transitions of this waveform represent the bits.

As is apparent from waveform L, the NRZ waveform switches between two voltage levels. When the voltage representing this waveform is applied to voltage controlled astable 312, it causes the generation of oscillations that shift between two frequencies. Waveform M represents the output of astable 312. Because of the frequencies involved with respect to the remaining waveforms is much higher, only cross-hatched regions are shown. Regions 360 to 364 represent one frequency while regions 370 to 373 represent another frequency.

There has thus been shown an improved data transmitting system which is relatively inexpensive. Part of the cost saving arises from the utilization of a recording head and associated circuitry which permits the simultaneous serial recording of the information bits longitudinally along the tape. Another part comes from the interleaving of sprocket and data bits to simplify synchronization. And part arises because of the ability of the transmitting apparatus to be left unattended and during that time to be interrogated by a central office.

There will now be obvious to those skilled in the art many modifications and variations which satisfy many or all of the objects and to which accrue the advantages of the invention. However, these modifications and variations will not depart from the spirit of the various aspects of the invention as defined in the appended claims.

Since the various elements shown in the system are made up of standard components, and standard assemblies, reference may be had to "High Speed Computing Devices," by the staff of Engineering Research Associates, Inc., McGraw-Hill Book Company, Inc., 1950; and appropriate chapters in "Computer Handbook," McGraw-Hill, 1962; edited by Harvey D. Huskey and Granino A. Korn, and for detailed circuitry, to for example "Principles of Transistor Circuits," edited by Richard F. Shea, published by John Wiley & Sons, Inc., New York, and Chapman and Hall, Limited, London, 1953 and 1957. In addition, other references are: for system organization and components: "Logic Design of Digital Computers," by M. Phister, Jr. (John Wiley & Sons, New York); "Arithmetic Operations in Digital Computers," by R. K. Richards (D. Van Nostrand Company, Inc., New York). For circuits and details: "Digital Computer Components and Circuits," by R. K. Richards (D. Van Nostrand Company, Inc., New York).

In addition, although power supplies, interlocks, protective devices and on-off switches have not been shown, such elements are obviously included in such a system in accordance with good engineering practice. Since such elements and techniques are obvious to those skilled in the art, they have not been shown so as to not becloud the basic teaching of the inventive concepts.

The only possible circuit element of the disclosed system that may not be notoriously well known in the art is the voltage controlled astable 312. However, such a circuit is described and shown in FIG. 25 of the copending application for Information Transfer System, Ser. No. 180,-435, filed Mar. 19, 1862, now U.S. Patent No. 3,284,774, and assigned to the same assignee. A variation of the circuit is also employed in the Data Set 202A manufactured for the American Telephone and Telegraph Co.

Such a circuit is shown and described in FIG. 10, page 16, of the technical bulletin entitled Data Set 202A, section 592–012–200, Issue 1, November 1961, American Telephone and Telegraph Co. Standard, copyrighted in 1961 by said company.

There will now be obvious to those skilled in the art many modifications and variations which satisfy many or all of the objects of the invention and to which accrue many or all of its advantages. However, these modifications and variations will not depart from the spirit of the invention as defined by the appended claims.

What is claimed is:

1. For combination with a strip-like magnetic record medium having a longitudinal axis along which the record medium is movable, a magnetic transducer positionable adjacent said record medium for inducing therein regions of magnetization longitudinally spaced from each other comprising a core of ferromagnetic material including a longitudinal axis for alignment parallel to the longitudinal axis of the record medium and a bottom face portion positionable against said record medium, said bottom face portion being provided with a plurality of first grooves longitudinally displaced from each other and aligned substantially transverse to the longitudinal axis of said core, and a plurality of second grooves longitudinally displaced from each other and aligned substantially transverse to the longitudinal axis of said core, said first grooves and said second grooves alternating longitudinally along the bottom face portion of said core, a plurality of first windings, each of said first windings being associated with a different one of said first grooves and including at least one turn of electrically conductive wire wound around said core and lying in the associated first groove, and a plurality of second windings, each of said second windings being associated with a different one of said second grooves and including at least one turn of electrically conductive wire wound around said core and lying in the associated second groove, at least two of said second windings being electrically connected in series, said first windings and said second windings being adapted to be selectively connected to sources of electrical energy so that coded combinations of regions disposed longitudinally along said record medium are magnetized.

2. The magnetic transducer of claim 1 wherein said first grooves are transversely displaced from said second grooves.

3. Apparatus for recording indicia as longitudinally displaced regions of magnetization on a strip-like magnetic record medium when the record medium being subjectable to movement in the direction of its longitudinal axis is stationary, comprising: a core of ferromagnetic material having a longitudinal axis parallel to the longitudinal axis of the record medium and including at least a bottom face portion positionable opposite said record medium, said bottom face portion being substantially parallel to said longitudinal axes; a plurality of first electric current conductor means spaced longitudinally along and extending transversely across said bottom face portion; a plurality of second electric current conductor means longitudinally spaced along and extending transversely across said bottom face portion; first current source means; a plurality of switch means for selectively connecting said first current source means to selected ones of said first electric current conductor means so that a pulse of electric current flows through a coded combination of said first electric current conductor means; second current source means; and other switch means responsive to the activation of any of said one of said plurality of switch means for connecting said second current source means to each of said second electric current conductor means so that a pulse of electric current flows through each of said second electric current conductor means when a pulse of current flows through at least one of said first electric current conductor means.

4. The apparatus of claim 3 wherein each of said plurality of current source means comprises a capacitor including first and second terminals, a source of electrical energy including first and second terminals, a resistor including first and second terminals, means for connecting the first terminal of said capacitor to the first terminal of said source of electrical energy, means for connecting the second terminal of said capacitor to the first terminal of said resistor, means for connecting the second terminal of said resistor to the second terminal of said source of electrical energy, and means for connecting the first terminal of said capacitor to the associated switch means of said plurality of switching means.

5. Apparatus for recording simultaneously on a strip-like record medium a character as a coded combination of discrete areas of magnetization longitudinally displaced along the longitudinal axis of the record medium and sprocket indicators as discrete areas of magnetization longitudinally displaced along said longitudinal axis wherein there is at least one sprocket indicator for each of the possible discrete areas of magnetization of the coded combination representing the character comprising a strip-like record medium; means for moving said strip-like record medium along its longitudinal axis; a magnetic transducer including a core having a bottom face portion disposed opposite said strip-like record medium, a plurality of first and second electric current conductor means longitudinally disposed along said bottom face portion and aligned transverse to said longitudinal axis; a plurality of first electric current sources, each including an output, selective switch means for selectively connecting said first electric current source outputs to said first electric current conductor means so that pulses of current flow through the associated first electric current conductor means in accordance with the coded representation of the character to be recorded; a controllably energizable electric current source means connected to all of said second electric current conductor means; control means responsive to the energization of any one of said first electric current sources to activate said controllably energizable electric current source means for causing a pulse of current to flow through all of said second electric current conductor means; and drive means responsive to said control means for longitudinally moving said record medium a given distance so that a new length of said record medium is available for the recording of each character.

6. The apparatus of claim 5 wherein said selective switch means includes a plurality of subject operable switches, each of said switches being associated with a different character, each of said switches having an output for generating a signal when the switch is operated, an encoder means including a plurality of inputs connected to the outputs of said switches and a plurality of outputs for transmitting a unique coded combination of signals for each signal received at one of its inputs, a plurality of signal operated semiconductor switches, each of said semiconductor switches being in a circuit including one of said first electric current conductor means and one of said first electric current sources and including a control input connected to an ouput of said encoder means so that when there is a signal transmitted from said output of said encoder means electric current flows from said one of said first electric current sources to said one of said first electric current conductor means.

7. For combination with a strip-like magnetic record medium having a longitudinal axis along which the record medium is movable, a magnetic transducer positionable opposite said record medium for inducing therein discrete regions of magnetization comprising: a plurality of first electric current conductor means; means for supporting said first electric conductor means longitudinally spaced from each other along the longitudinal axis of said record medium, each of said first current conductor means extending transverse to said longitudinal axis; a plurality of second electric current conductor means; and means for supporting said second electric conductor means longitudinally spaced from each other along the longitudinal axis of said record medium, each of said second current conductor means extending transverse to said longitudinal axis, at least two of said second electric conductor means being connected in series, said plurality of first electric current conductor means being adapted to be controllably connected selectively and said plurality of second electric current conductor means being adapted to be controllably connected to an electric current source means so that the regions of said record medium opposite the selected ones of said first electric current conductor means and opposite the second electric current conductor means are magnetized.

8. The magnetic transducer of claim 7 wherein the means for supporting said electric conductor means is a ferromagnetic material.

9. Apparatus for recording indicia as longitudinally displaced regions of magnetization on a strip-like magnetic record medium comprising: a plurality of first electric current conductor means, means for supporting said first electric conductor means spaced longitudinally along and extending transversely across said record medium, at least one second electric current conductor, means for supporting said second electric conductor means longitudinally spaced from at least one of said first electric conductor means and extending transversely across said record medium; current source means; a plurality of switch means for selectively connecting said current source means to selected ones of said first electric current conductor means so that a pulse of electric current flows through a coded combination of said first electric current conductor means; and other switch means responsive to the activation of any of said one of said plurality of switch means for connecting said current source means to said second electric current conductor means so that a pulse of electric current flows through said second electric current conductor means when a pulse of current flows through at least one of said first electric current conductor means.

10. The apparatus of claim 9 wherein said means for supporting said first and second current conductor means includes a core of ferromagnetic material having a bottom face portion positionable opposite said record medium, said first and second electric current conductor means alternating longitudinally along said bottom face portion of said core.

References Cited

UNITED STATES PATENTS

| | | | |
|---|---|---|---|
| 3,303,483 | 2/1967 | Rabinow ---------- | 340—174.1 |
| 3,196,450 | 7/1965 | Chapin ----------- | 340—174.1 |

BERNARD KONICK, *Primary Examiner.*

A. I. NEUSTADT, *Assistant Examiner.*

U.S. DEPARTMENT OF COMMERCE
PATENT OFFICE
Washington, D.C. 20231

UNITED STATES PATENT OFFICE

CERTIFICATE OF CORRECTION

Patent No. 3,401,396 September 10, 1968

Edgar Wolf et al.

It is certified that error appears in the above identified patent and that said Letters Patent are hereby corrected as shown below:

Column 12, line 72, "288", second occurrence, should read -- 278 --; line 73, "278" should read -- 288 --. Column 13, line 16, "dveice" should read -- device --. Column 14, line 23, beginning with "There will now" cancel all to and including "appended claims.", same column 14, line 28.

Signed and sealed this 17th day of March 1970.

(SEAL)
Attest:

Edward M. Fletcher, Jr.
Attesting Officer

WILLIAM E. SCHUYLER, JR.
Commissioner of Patents